US012453578B2

(12) United States Patent
Kim et al.

(10) Patent No.: US 12,453,578 B2
(45) Date of Patent: Oct. 28, 2025

(54) TROCAR INSTRUMENT AND AUXILIARY DEVICE THEREFOR (71) Applicants: CHUNGNAM NATIONAL UNIVERSITY HOSPITAL, Daejeon (KR); THE INDUSTRY & ACADEMIC COOPERATION IN CHUNGNAM NATIONAL UNIVERSITY (IAC), Daejeon (KR)

(72) Inventors: Joo-Hak Kim, Daejeon (KR); Sang-Ha Oh, Daejeon (KR)

(73) Assignees: CHUNGNAM NATIONAL UNIVERSITY HOSPITAL, Daejeon (KR); THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 865 days.

(21) Appl. No.: 17/604,565

(22) PCT Filed: Apr. 17, 2020

(86) PCT No.: PCT/KR2020/005187
§ 371 (c)(1),
(2) Date: Oct. 18, 2021

(87) PCT Pub. No.: WO2020/213999
PCT Pub. Date: Oct. 22, 2020

(65) Prior Publication Data
US 2022/0175417 A1 Jun. 9, 2022

(30) Foreign Application Priority Data
Apr. 18, 2019 (KR) .................. 10-2019-0045694

(51) Int. Cl.
A61B 17/34 (2006.01)
A61B 17/00 (2006.01)

(52) U.S. Cl.
CPC .......... *A61B 17/3417* (2013.01); *A61B 2017/00424* (2013.01); *A61B 2017/347* (2013.01)

(58) Field of Classification Search
CPC ........... A61M 25/065; A61M 25/0625; A61M 2025/0656; A61M 25/06; A61M 25/0606;
(Continued)

(56) References Cited

U.S. PATENT DOCUMENTS

| 5,232,450 A * | 8/1993 | Green ................ A61B 17/3496 604/164.01 |
| 2003/0012566 A1 | 1/2003 | Kindaichi |
| 2003/0125666 A1 | 7/2003 | Kasahara et al. |

FOREIGN PATENT DOCUMENTS

| JP | 11-137686 A | 5/1999 |
| KR | 10-1540199 B1 | 7/2015 |

(Continued)

OTHER PUBLICATIONS

International Search Report issued on Aug. 7, 2020 in corresponding application No. PCT/KR2020/005187, 5 pgs.

*Primary Examiner* — Thomas McEvoy
(74) *Attorney, Agent, or Firm* — Maier & Maier, PLLC (57) ABSTRACT An auxiliary device for use in a trocar instrument, including a trocar needle having a fastening groove formed on an outer circumferential surface thereof. The auxiliary device includes: a body into which at least a portion of the trocar needle is inserted; and a hook connected to the body and configured to be inserted into the fastening groove of the trocar needle. The hook includes a fixing portion fixed to the body and a coupling portion extending from one end of the fixing portion and configured to be inserted into the fasten- (Continued)

ing groove when the trocar needle is disposed inside the body. A gap is formed between the fixing portion and the coupling portion.

18 Claims, 7 Drawing Sheets

(58) Field of Classification Search
CPC .......... A61M 25/013; A61B 2017/347; A61B 2017/0046; A61B 2017/00464; A61B 2017/00469; A61B 2017/00473; A61B 17/3415
See application file for complete search history.

(56) References Cited

FOREIGN PATENT DOCUMENTS

| | | | |
|---|---|---|---|
| KR | 10-1808442 | B1 | 12/2017 |
| KR | 10-1905572 | B1 | 10/2018 |
| KR | 10-2098251 | B1 | 4/2020 |

\* cited by examiner

TROCAR INSTRUMENT AND AUXILIARY DEVICE THEREFOR

FIELD

The present disclosure relates to a trocar instrument and an auxiliary device therefor.

BACKGROUND

In general, complications may occur if unnecessary blood, serous fluid or exudate generated in a patient's body is not discharged immediately. In order to forcibly discharge such blood or exudate, there has been used a medical low-pressure constant evacuator (e.g., Hemovac, Zimmer Biomet, USA, or Barovac, Sewon Medical, Republic of Korea).

The medical evacuator includes a drain container, a trocar needle configured to penetrate a skin, and a tube (drainage tubing) configured to connect the drain container with the trocar needle. Among them, the trocar needle is formed to be bendable by about 20 to 30 degrees for convenience when an operating surgeon penetrates a skin with the trocar needle. Meanwhile, the trocar needle is made of a metallic material in a cylindrical shape, and the surgical gloves are normally stained with body fluid during surgery. Therefore, it is difficult to grip the trocar needle when penetrating the skin with the trocar needle. There is also a problem that the trocar needle is likely to rotate during penetration, leading a difficulty in using the trocar needle or to a problem that the organs, blood vessels and nerves of a patient may be damaged by a sharp tip of the bent trocar needle that slides and/or rotates.

Furthermore, in the related art, when the drainage tubing is to be located in a dependent portion of a human body so as to ensure good drainage, or when the trocar needle is intentionally used in a region covered by wrinkles, such as the armpit in order to cosmetically minimize a scar that inevitably remains on the penetrated skin, there is a problem that the trocar needle may be inserted at an undesired position, which occurs for the reasons described above.

In order to solve these problems of the related art, Korean Patent No. 10-1540199 was presented. Korean Patent No. 10-1540199 discloses a configuration in which a handle portion for increasing a frictional force is formed around a trocar needle, or a configuration in which a coupling portion is separately formed inside the rear end of a trocar needle and a detachable fixing handle is coupled to the coupling portion.

However, this related art has a flaw that the problems occurring in the process of guiding the trocar needle to a desired site and percutaneously penetrating the desired site could not be completely solved. Accordingly, a need has existed for the study on a novel trocar needle structure that can be easily gripped by the user, can be prevented from rotating during use, and can allow the user to completely control and adjust the sharp trocar needle.

PRIOR ART DOCUMENT (Patent Document 1) Korean Patent No. 10-1540199 (published on Jul. 22, 2015)

Summary

Embodiments of the present disclosure provide a trocar instrument capable of being kept against rotation during use, and an auxiliary device for use in such a trocar instrument.

Furthermore, embodiments of the present disclosure provide a trocar instrument capable of enabling a user to remove an auxiliary device from a trocar needle with one hand and, an auxiliary device for use in such a trocar instrument.

Furthermore, embodiments of the present disclosure provide a trocar instrument having a left/right symmetrical structure capable of enabling a user to remove an auxiliary device regardless of the position of a user or the orientation of a hand, and an auxiliary device for use in such a trocar instrument.

Furthermore, embodiments of the present disclosure provide a trocar instrument having a configuration capable of applying not only a frictional force but also a push/pull force to the contact surfaces of the gripping fingers, and an auxiliary device for use in such a trocar instrument.

Furthermore, embodiments of the present disclosure provide a trocar instrument capable of minimizing interference between a tube (drainage tubing) connected to a trocar needle and an auxiliary device, and an auxiliary device for use in such a trocar instrument.

Furthermore, embodiments of the present disclosure provide a trocar instrument capable of inclining the separation direction in respect of the bending of a trocar needle so that the trocar needle can be separated with a minimum force, and an auxiliary device for use in such a trocar instrument.

Furthermore, embodiments of the present disclosure provide a trocar instrument capable of enabling a user to stably support a trocar needle through the use of an ergonomic configuration of a grip portion, enabling a user to accurately recognize the bending direction of a trocar needle through an auxiliary device and consequently solving the aforementioned problems, and an auxiliary device for use in such a trocar instrument.

In accordance with an embodiment of the present disclosure, there is provided an auxiliary device for a use in a trocar instrument including a trocar needle having a fastening groove formed on an outer circumferential surface thereof, including: a body into which at least a portion of the trocar needle is inserted; and a hook connected to the body and configured to be inserted into the fastening groove of the trocar needle, wherein the hook includes a fixing portion fixed to the body and a coupling portion extending from one end of the fixing portion and configured to be inserted into the fastening groove when the trocar needle is disposed inside the body, and wherein a gap is formed between the fixing portion and the coupling portion.

Further, the body may have a side surface, at least a portion of which is opened.

Further, an anti-slip portion may be formed on an outer circumferential surface of the body.

Further, the anti-slip portion may be provided as a recess inwardly recessed at a predetermined depth from the outer circumferential surface of the body.

Further, an engaging portion configured to be seated with a finger of a user may be formed on the outer circumferential surface of the body, and the engaging portion may be positioned closer to an end of the body than the anti-slip portion.

Further, the auxiliary device may further include a first flange extending radially from one end of the body and a second flange extending radially from the other end of the body.

Further, the hook may be provided to penetrate the body and to move into and out of the body.

Further, the hook may be shaped such that free ends of the fixing portion and the coupling portion are positioned on the same plane.

Further, the hook may be shaped such that a free end of the coupling portion protrudes more outward than a free end of the fixing portion.

Further, the hook may include a coupling portion rotatably coupled to the body and an elastic member configured to connect the coupling portion and the body and configured to apply a rotational force to the coupling portion in one direction.

Further, the hook may include a pair of hooks provided opposite to each other on both sides of the body.

In accordance with another embodiment of the present disclosure, there is provided a trocar instrument, including: the auxiliary device describe above; and a trocar needle configured to be removably coupled to the auxiliary device.

Further, a guide groove connected to the fastening groove and extending in a straight line or a curved line may be formed on an outer circumferential surface of the trocar needle.

According to the embodiments of the present disclosure, it is possible to prevent the trocar needle from rotating.

Furthermore, according to the embodiments of the present disclosure, it is possible for the user to conveniently remove the auxiliary device with one hand. The opposite hand may be used to apply a counteractive force to the point where the trocar needle is expected to percutaneously penetrate outward (from the inside to the outside). This makes it possible to easily perform a surgical procedure.

Furthermore, according to the embodiments of the present disclosure, the auxiliary device having a left/right symmetrical structure enables the user to remove the auxiliary device regardless of the position of the user or the orientation of the hand.

Furthermore, according to the embodiments of the present disclosure, it is possible to apply not only a frictional force but also a push/pull force to the contact surfaces of the gripping fingers through the use of the two flange structures extending radially outward from both end portions of the auxiliary device that provides the grip portion in the trocar needle.

Furthermore, according to the embodiments of the present disclosure, it is possible to minimize the interference with the tune (drainage tubing) because the auxiliary device is removed backward and downward in the process of removing the auxiliary device from the trocar needle.

Furthermore, according to the embodiments of the present disclosure, the trocar needle may be separated with a minimum force by inclining the separation direction in respect of the bending of a trocar needle in the process of removing the auxiliary device, which provides the grip portion, from the trocar needle.

Furthermore, according to the embodiments of the present disclosure, it is possible for the user to stably support the trocar needle through the use of the ergonomic configuration of the auxiliary device that provides the grip portion in the trocar needle. It is also possible for the user to accurately recognize the bending direction of the trocar needle through the auxiliary device.

DETAILED DESCRIPTION OF THE EMBODIMENTS

While the foregoing has described what are considered to be the best mode and/or other examples based on the principle that the inventor can properly define his own disclosure as the concept of the term, the terms and words used in the specification and claims described below shall not be interpreted in a conventional or dictionary sense, but shall be interpreted in terms of meaning and concepts conforming to the technical spirit of the present disclosure. Therefore, since the embodiments described in the specification and the configurations shown in the drawings are only the most preferred embodiments of the present disclosure, and do not represent all of the technical spirit of the present disclosure, it should be understood that there may be various equivalents and variations that could substitute them at the time of the present application.

Hereinafter, preferable embodiments of the present disclosure will be described in detail with reference to the accompanying drawings. It should be noted that the same component in the drawing is represented by the same symbol as possible. Further, a detailed description of the known function and configuration that may obscure the gist of this disclosure will be omitted. For the same reason, some components in the drawings are exaggerated, omitted or schematically illustrated, and the size of each component does not exactly reflect its actual size.

Further, in the present specification, the terms such as "upper", "lower", "side" and the like refer to directions in the drawings to which reference is made. Such terms can be differently expressed when a direction of a target is changed.

Figure 1:
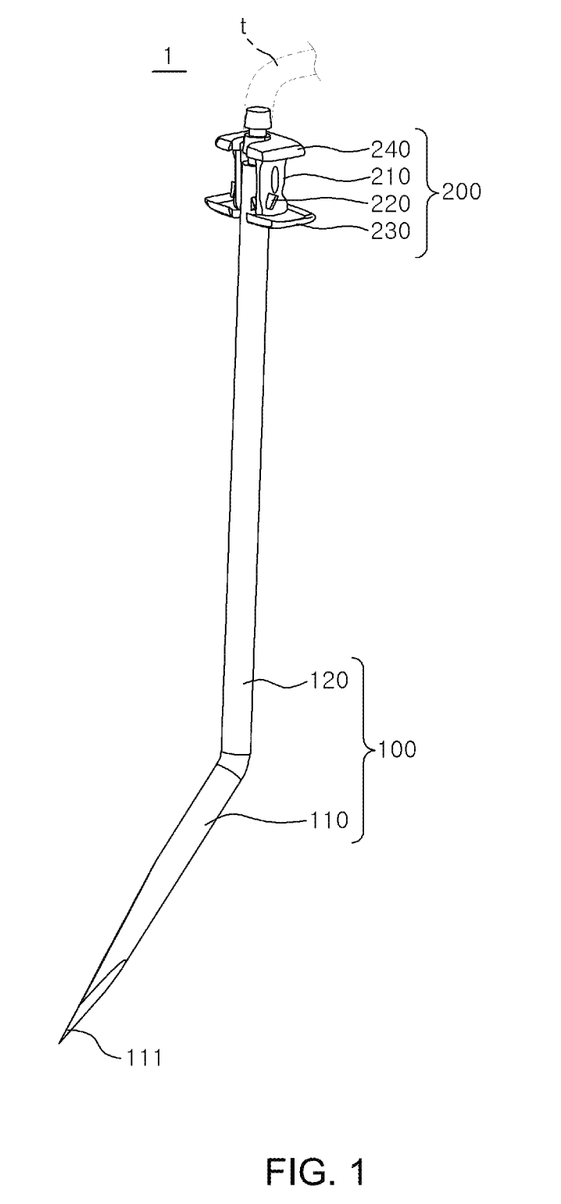
FIG. 1 is a schematic perspective view of a trocar instrument according to an embodiment of the present disclosure.
Figure 2:
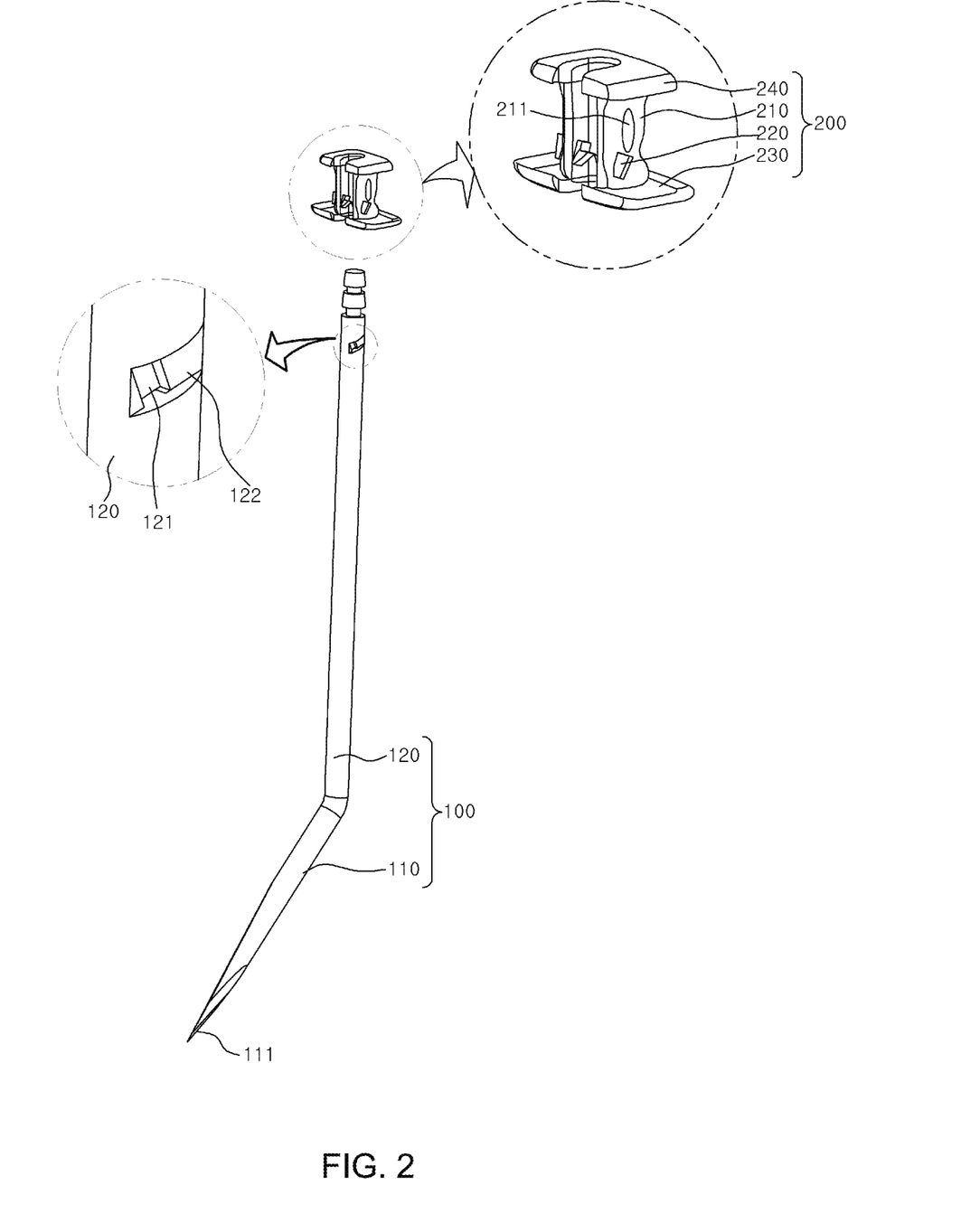
FIG. 2 is a schematic exploded perspective view of the trocar instrument according to the embodiment of the present disclosure.
Figure 3A:
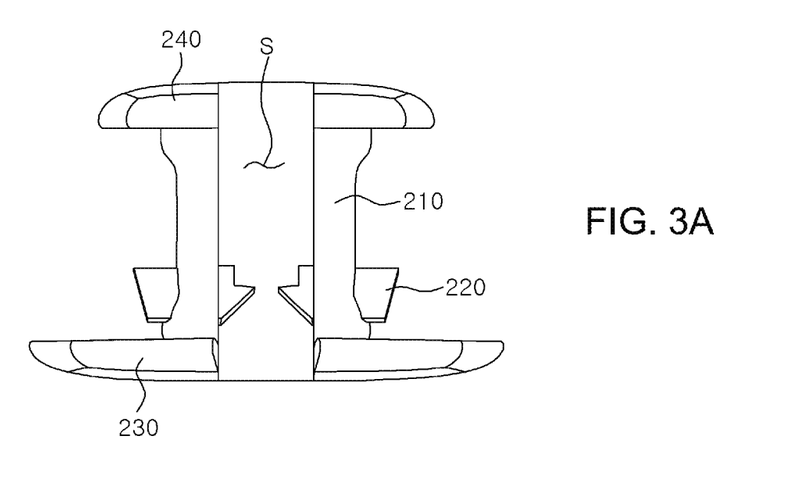
FIG. 3A is a front view of an auxiliary device according to the embodiment of the present disclosure.
Figure 3B:
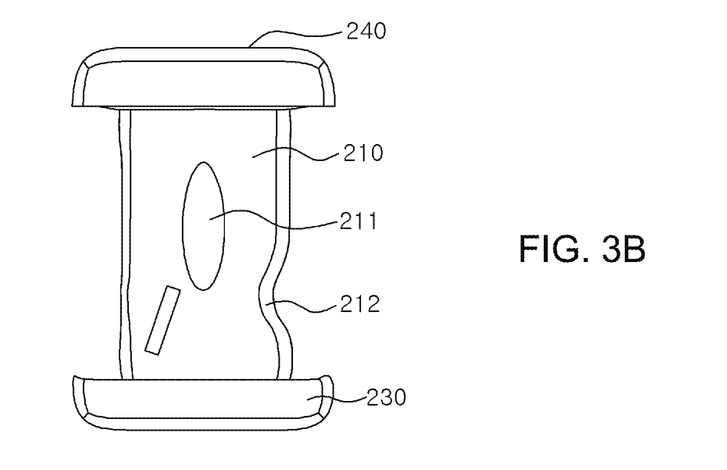
FIG. 3B is a side view of the auxiliary device according to the embodiment of the present disclosure
Figure 4:
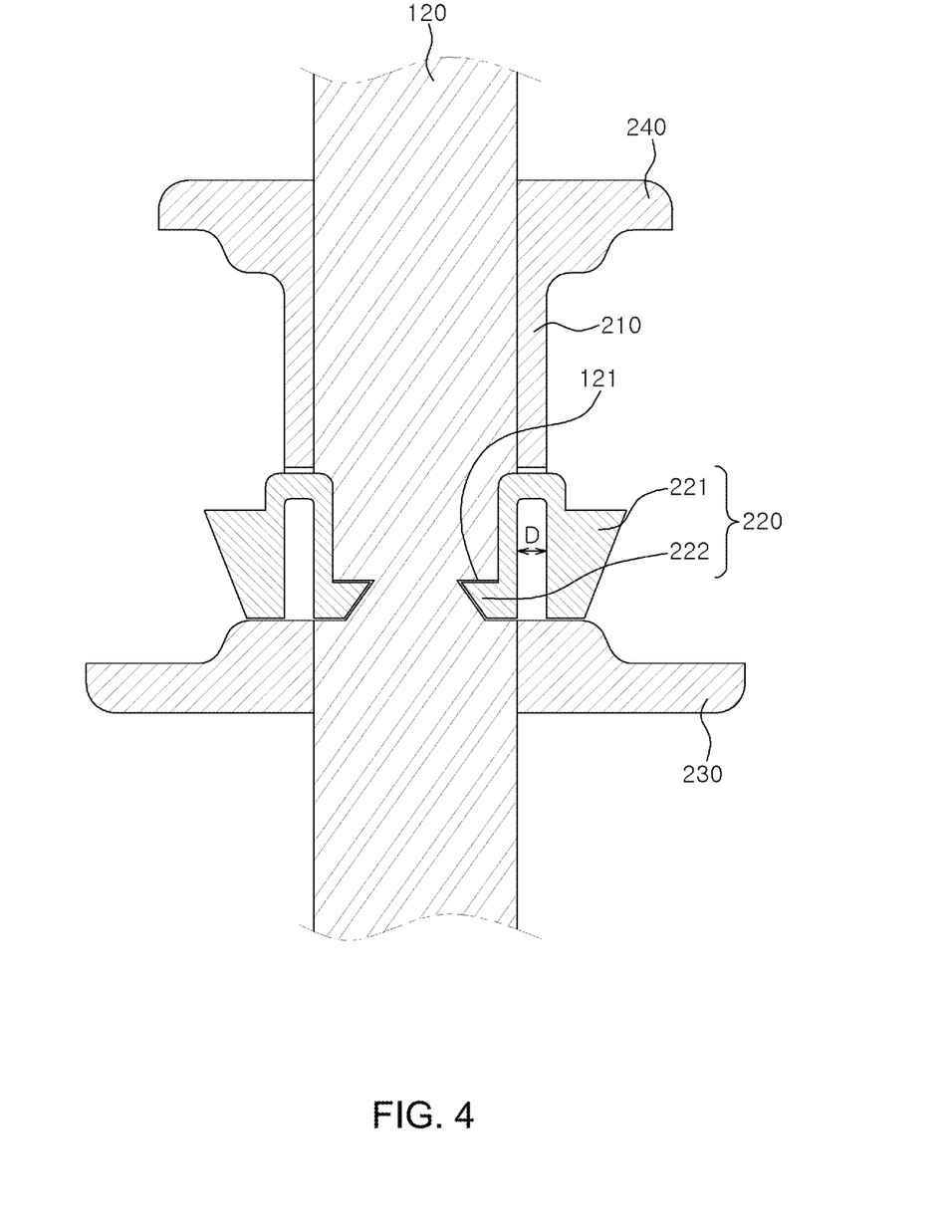
FIG. 4 is a schematic partial sectional view of the trocar instrument according to the embodiment of the present disclosure.
Figure 5:
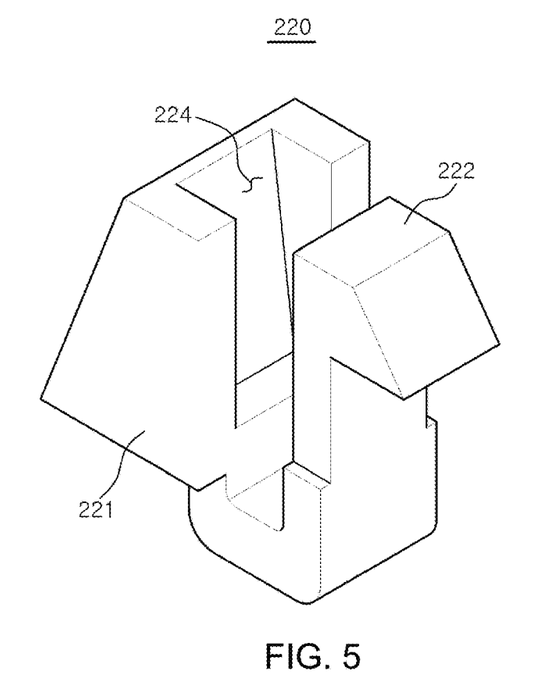
FIG. 5 is a schematic perspective view of a hook according to the embodiment of the present disclosure.

FIG. 1 is a schematic perspective view of a trocar instrument according to an embodiment of the present disclosure. FIG. 2 is a schematic exploded perspective view of the trocar instrument according to the embodiment of the present disclosure. FIGS. 3A and 3B are front views of an auxiliary device according to the embodiment of the present disclosure. FIG. 4 is a schematic partial sectional view of the trocar instrument according to the embodiment of the present disclosure. FIG. 5 is a schematic perspective view of a hook according to the embodiment of the present disclosure.

Referring to FIGS. 1 to 5, the trocar instrument 1 according to an embodiment of the present disclosure is included in a medical low-pressure constant evacuator used to discharge unnecessary blood or exudate generated in the body of a patient to the outside. The trocar instrument 1 is connected to a tube (drainage tubing) installed inside the body. The trocar instrument 1 may include a trocar needle 100 configured to penetrate the skin of the patient and having a fastening groove 121 formed on an outer circumferential surface thereof, and an auxiliary device 200 removably coupled to the outer circumferential surface of the trocar needle 100.

The trocar needle 100 may be provided to penetrate the skin of the patient. The trocar needle 100 may be made of a metallic material. The trocar needle 100 may include a front end portion 110 having a pointed end formed at one side and a rear end portion 120 extending from the other side of the front end portion 110 and having an extended end to which a tube "t" is connected. The rear end portion 120 may be connected to the front end portion 110 so as to be inclined at a predetermined angle with respect to a longitudinal direction of the front end portion 110. For example, the angle between a longitudinal center axis of the rear end portion 120 and a longitudinal center axis of the front end portion 110 may be about 20 to 30 degrees.

The auxiliary device 200 may include a body 210 in which the trocar needle 100 is disposed, and hooks 220 configured to penetrate the body 210 and inserted into fastening grooves 121 of the trocar needle 100.

The fastening grooves 121 may be formed on the outer circumferential surface of the trocar needle 100. As an example, the fastening grooves 121 may be formed on the outer circumferential surface of the rear end portion 120. The fastening grooves 121 may be provided for fastening the auxiliary device 200 to the trocar needle 100, and may be formed in a groove shape recessed at a predetermined depth from the outer circumferential surface of the trocar needle 100. In addition, the fastening grooves 121 may be provided in a shape corresponding to an outer surface of a hook 220 of the auxiliary device 200. The fastening grooves 121 may be provided symmetrically on both sides in a radial direction of the outer circumferential surface of the trocar needle 100.

Guide grooves 122 connected to the fastening grooves 121 may be formed on the outer circumferential surface of the trocar needle 100. Each of the guide grooves 122 may be connected at one side to each of the fastening grooves 121 and may extend in a straight line or a curved line. By allowing the guide grooves 122 to extend in the straight line or the curved line, it is possible to minimize interference with the tube "t" when the auxiliary device 200 is attached to or detached from the trocar needle 100. The guide grooves 122 may be formed so to be recessed at a predetermined depth from the outer circumferential surface of the trocar needle 100. In this regard, the depth of the fastening grooves 121 recessed from the outer circumferential surface of the trocar needle 100 may be greater than the depth of the guide grooves 122 recessed from the outer circumferential surface of the trocar needle 100. The guide grooves 122 may guide the movement of the hooks 220 when the auxiliary device 200 is attached or detached. Furthermore, in view of the angle formed by the front end portion 110 and the rear end portion 120 of the trocar needle 100, the fastening grooves 121 and the guide grooves 122 may make an angle, at which the auxiliary device 200 can be mechanically separated with a minimum force, with respect to a longitudinal axis of the trocar needle 100. The fastening grooves 121 and the guide grooves 122 may be provided in a symmetrical shape on both sides of the outer circumferential surface of the trocar needle 100.

The auxiliary device 200 may be removably coupled to the trocar needle 100. The auxiliary device 200 is provided to prevent rotation of the trocar needle 100 when the user uses the trocar instrument 1. The auxiliary device 200 may be removably coupled to the outer circumferential surface of the trocar needle 100 and may serve as a handle.

The body 210 of the auxiliary device 200 may be coupled to the outer circumferential surface of the trocar needle 100. To this end, the body 210 may include an internal space in which the trocar needle 100 is disposed. The internal space "S" may be formed in a shape corresponding to the outer shape of the trocar needle 100.

At least a portion of the side surface of the body 210 may be opened. Thus, the trocar needle 100 may be inserted into the opening of the side surface of the body 210 and may be disposed in the internal space "S". In addition, the upper and lower ends of the internal space "S" may be opened. Thus, the body 210 may be coupled to any position of trocar needle 100. In other words, the trocar needle 100 may be exposed to the outside through the upper and lower ends of the internal space "S".

The auxiliary device 200 may further include the first flange 230 extending radially outwardly from one end of the body 210 and the second flange 240 extending radially from the other end of the body 210. As an example, the first flange 230 may extend radially from the lower side of the body 210, and the second flange 240 may extend radially from the upper side of the body 210. The user may adjust the path of the trocar needle 100 by using the flanges so as to correspond to the force for gripping, pushing and pulling the body 210 disposed between the first flange 230 and the second flange 240.

An anti-slip portion 211 may be formed on the outer circumferential surface of the body 210. The anti-slip portion 211 may be provided to prevent a finger from sliding on the body 210 when the user grips the body 210. For example, the anti-slip portion 211 may be provided in a groove shape recessed at a predetermined depth from the outer circumferential surface of the body 210. However, the anti-slip portion 211 is not limited to the proposed embodiment, but may be changed to various configurations such as an anti-slip pad, a plurality of protrusions, uneven portions and the like as long as they can prevent a finger from sliding on the body 210.

In addition, an engaging portion 212 may be formed on the outer circumferential surface of the body 210 so that the finger is seated on the engaging portion 212 when the user grips the auxiliary device 200. For example, the engaging portion 212 may be recessed from the surface of the body 210 at a position closer to the end of the body 210 than the anti-slip portion 211. In other words, the engaging portion 212 may be formed at a position closer to a first flange 230 than the anti-slip portion 211 in the body 210. However, this is nothing more than an example. The engaging portion 212 may be formed at a position closer to a second flange 240 than the anti-slip portion 211 in the body 210.

The auxiliary device 200 may include the hooks 220, and the auxiliary device 200 may be stably fastened to the trocar needle 100 by the hooks 220. The hooks 220 may be symmetrically provided opposite to each other on both sides of the body 210. At least a portion of each of the hooks 220 may be inserted into each of the fastening grooves 121 of the trocar needle 100 through the body 210. For example, when the user presses the trocar needle 100 or the auxiliary device 200 in a state in which the hooks 220 are disposed in the guide grooves 122, the hooks 220 may slide along the guide grooves 122 and then may be inserted into the fastening grooves 121.

The hooks 220 may be provided so that at least a portion of each of the hooks 220 can move into and out of the body 210. For example, each of the hooks 220 may include a fixing portion 221 fixed to the body 210, and a coupling portion 222 extending from one end of the fixing portion 221 so that the extended end portion thereof is disposed inside the body 210. In this regard, a gap "D" may be formed between the fixing portion 221 and the coupling portion 222. Thus, the coupling portion 222 may rotate at a predetermined angle by using one end thereof connected to the fixing portion 221 as a pivot point. When the user presses the trocar needle 100 or the auxiliary device 200 in a state in which the coupling portion 222 is disposed in the guide groove 122, the coupling portion 222 may be rotated to reduce a gap "D" between the coupling portion 222 and the fixing portion 221. As the trocar needle 100 enters the internal space "S" of the body 210, the coupling portion 222 may slide along the guide groove 122 and then may be inserted into the fastening groove 121. The structure of the hooks 220 may be changed.

In addition, the fixing portion 221 may have a recess 224 recessed from the surface facing the coupling portion 222. Accordingly, when the coupling portion 222 rotates in the direction in which the gap D decreases, the recess 224 prevents occurrence of interference between the fixing portion 221 and the coupling portion 222, thereby increasing the range of rotation of the coupling portion 222.

Figure 6:
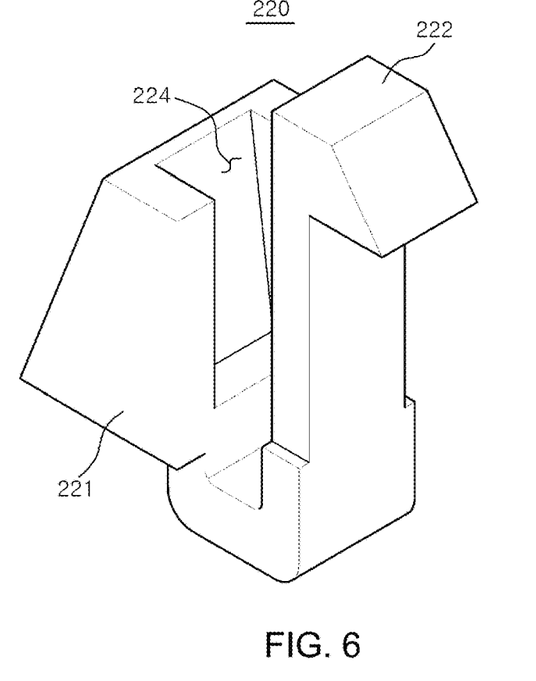
FIG. 6 is a perspective view showing a modification of the hook shown in FIG. 5.

In addition, each of the hooks 220 may be shaped such that the free ends of the fixing portion 221 and the coupling portion 222 are positioned on the same plane. However, this is nothing more than an example. As shown in FIG. 6, each of the hooks 220 may be shaped such that the free end of the coupling portion 222 protrudes more outward than the free end of the fixing portion 221.

Hereinafter, the structure of a hook 220 according to another embodiment of the present disclosure will be described with reference to FIGS. 7 and 8.

Figure 7:
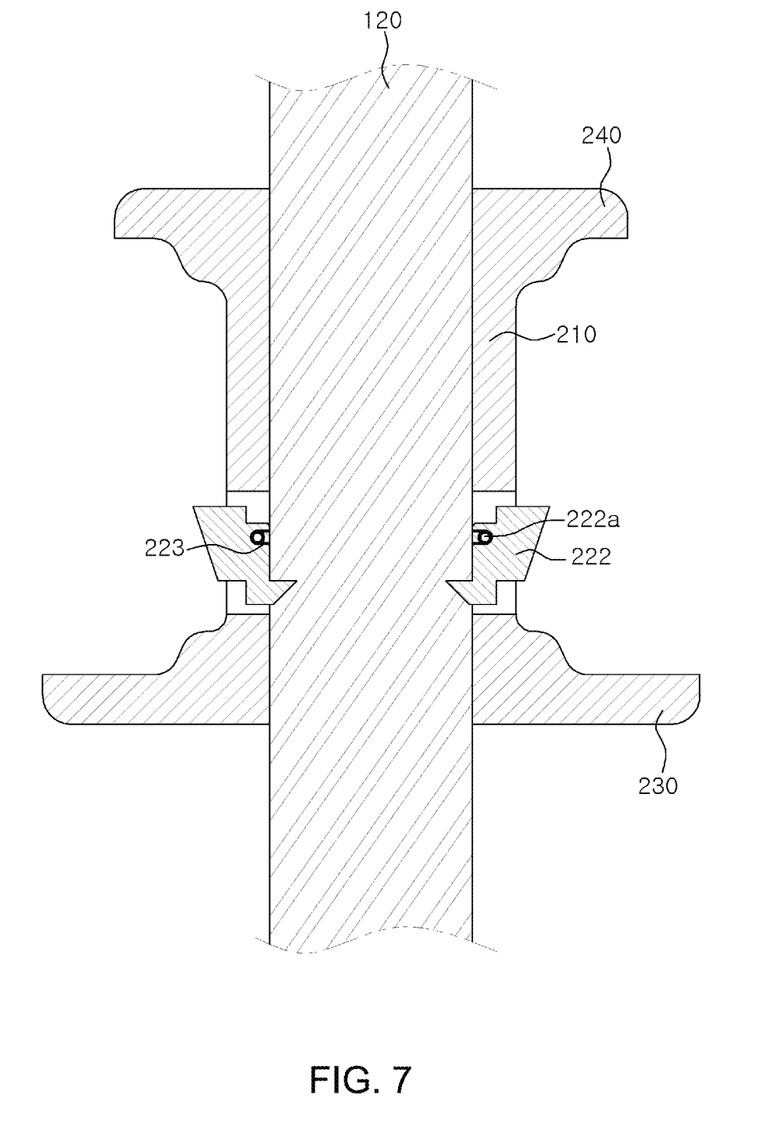
FIG. 7 is a schematic partial sectional view of a trocar instrument according to another embodiment of the present disclosure.

FIG. 7 is a schematic partial sectional view of a trocar instrument according to another embodiment of the present disclosure. FIG. 8 is a schematic perspective view of a hook according to another embodiment of the present disclosure.

Figure 8:
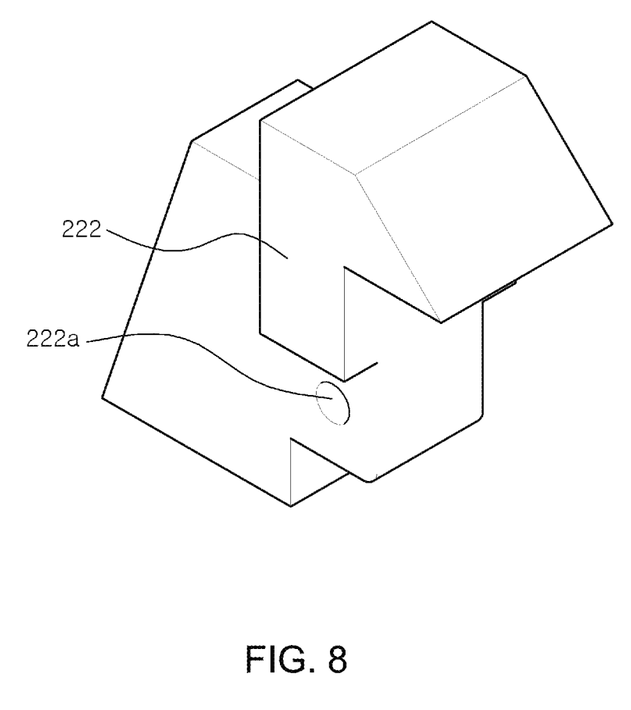
FIG. 8 is a schematic perspective view of a hook according to another embodiment of the present disclosure.

Referring to FIGS. 7 and 8, each of the hooks 220 according to another embodiment of the present disclosure may include a coupling portion 222 rotatably coupled to the body 210 and an elastic member (coil spring) 223 connected to the body 210 and configured to apply a rotational force to the coupling portion 222 in one direction.

The coupling portion 222 may be rotatably coupled to the body 210. For example, the coupling portion 222 may be coupled to the body 210 by a rotation shaft member 222a so that it can rotate about the rotation shaft member 222a. At this time, the elastic member 223 may be coupled to one side of the coupling portion 222 and the body 210 to apply a rotational force to the coupling portion 222. The other end of the coupling portion 222 may be disposed in the internal space "S" of the body 10 by the elastic member 223. In the hooks 220 according to another embodiment of the present disclosure, just like the hooks according to the embodiment of the present disclosure shown in FIG. 3, as the trocar needle 100 enters the internal space "S" of the body 210, the other end of the coupling portion 222 may be rotated toward the outside of the inner space "S". When the trocar needle 100 enters the internal space "S" of the body 210, the other end of the coupling portion 222 may be rotated toward the inside of the internal space "S" and may be inserted into the fastening groove 121.

Each of the trocar instruments 1 according to the embodiments of the present disclosure described above includes the auxiliary device 200 removably coupled to the trocar needle 100. Therefore, when the user uses the trocar instrument 1, it is possible to prevent the hand of the user from slipping on the outer circumferential surface of the trocar needle 100. This makes it possible to prevent the trocar needle 100 from rotating during use.

While the disclosure has been shown and described with respect to the embodiments, the present disclosure is not limited thereto. It will be understood by those skilled in the art that various changes and modifications may be made without departing from the scope of the disclosure as defined in the following claims.

What is claimed is:

1. An auxiliary device for a use in a trocar instrument including a trocar needle having a fastening groove formed on an outer circumferential surface thereof, comprising:
    a body into which at least a portion of the trocar needle is inserted;
    a hook connected to the body and configured to be inserted into the fastening groove of the trocar needle;
    a first flange extending radially outward from one longitudinal end of the body; and
    a second flange extending radially outward from the other longitudinal end of the body,
    wherein the hook includes a fixing portion fixed to the body and a coupling portion extending from one end of the fixing portion and configured to be inserted into the fastening groove when the trocar needle is disposed inside the body,
    wherein a gap is formed between the fixing portion and the coupling portion, and
    wherein the hook is disposed between the first flange and the second flange, and the first flange, the second flange and a portion of the hook are exposed to an outside.

2. The auxiliary device of claim 1, wherein the body has a side surface, at least a portion of which is opened.

3. The auxiliary device of claim 1, wherein an anti-slip portion is formed on an outer circumferential surface of the body.

4. The auxiliary device of claim 3, wherein the anti-slip portion is provided as a recess inwardly recessed at a predetermined depth from the outer circumferential surface of the body.

5. The auxiliary device of claim 3, wherein an engaging portion configured to be seated with a finger of a user is formed on the outer circumferential surface of the body, and the engaging portion is positioned closer to an end of the body than the anti-slip portion.

6. The auxiliary device of claim 1, wherein the hook is provided to penetrate the body and to move into and out of the body.

7. The auxiliary device of claim 6, wherein the hook includes a coupling portion rotatably coupled to the body and an elastic member configured to connect the coupling portion and the body and configured to apply a rotational force to the coupling portion in one direction.

8. The auxiliary device of claim 6, wherein the hook includes a pair of hooks provided opposite to each other on both sides of the body.

9. The auxiliary device of claim 1, wherein the hook is shaped such that free ends of the fixing portion and the coupling portion are positioned on the same plane.

10. The auxiliary device of claim 1, wherein the hook is shaped such that a free end of the coupling portion protrudes more outward than a free end of the fixing portion.

11. A trocar instrument, comprising:
    a trocar needle having a fastening groove formed on an outer circumferential surface thereof;
    an auxiliary device configured to be removably coupled to the trocar needle, wherein the auxiliary device includes; a body into which at least a portion of the trocar needle is inserted; a hook connected to the body and configured to be inserted into the fastening groove of the trocar needle;

a first flange extending radially outward from one longitudinal end of the body; and a second flange extending radially outward from the other longitudinal end of the body, wherein the hook includes a fixing portion fixed to the body and a coupling portion extending from one end of the fixing portion and configured to be inserted into the fastening groove when the trocar needle is disposed inside the body, wherein a gap is formed between the fixing portion and the coupling portion, and wherein the hook is disposed between the first flange and the second flange, and the first flange, the second flange and a portion of the hook are exposed to an outside.

12. The trocar instrument of claim 11, wherein a guide groove connected to the fastening groove and extending in a straight line or a curved line is formed on an outer circumferential surface of the trocar needle.

13. The trocar instrument of claim 11, wherein the body has a side surface, at least a portion of which is opened.

14. The trocar instrument of claim 13, wherein the anti-slip portion is provided as a recess inwardly recessed at a predetermined depth from the outer circumferential surface of the body.

15. The trocar instrument of claim 13, wherein an engaging portion configured to be seated with a finger of a user is formed on the outer circumferential surface of the body, and the engaging portion is positioned closer to an end of the body than the anti-slip portion.

16. The trocar instrument of claim 11, wherein an anti-slip portion is formed on an outer circumferential surface of the body.

17. The trocar instrument of claim 11, wherein the hook is provided to penetrate the body and to move into and out of the body.

18. The trocar instrument of claim 11, wherein the hook is shaped such that free ends of the fixing portion and the coupling portion are positioned on the same plane.

* * * * *